United States Patent [19]
Ishikawa et al.

[11] Patent Number: 6,058,126
[45] Date of Patent: May 2, 2000

[54] LASER-DIODE-PUMPED SOLID STATE LASER AND RADIATION IMAGE READ-OUT SYSTEM

[75] Inventors: Hiromi Ishikawa; Yoji Okazaki; Hisashi Ohtsuka, all of Kanagawa-ken, Japan

[73] Assignee: Fuji Photo Film Co., Ltd., Kanagawa-ken, Japan

[21] Appl. No.: 09/109,053

[22] Filed: Jul. 2, 1998

[30] Foreign Application Priority Data

Jul. 2, 1997 [JP] Japan ................................. 9-176659

[51] Int. Cl.[7] .................................................. H01S 3/091
[52] U.S. Cl. .............................. 372/75; 372/20; 372/21; 372/29; 372/38; 372/43; 372/46; 372/69; 372/70; 372/92; 372/98
[58] Field of Search ..................... 372/9, 20, 21, 372/29, 38, 39, 40, 43, 44, 46, 69, 70, 75, 92, 98

[56] References Cited

U.S. PATENT DOCUMENTS

| | | | |
|---|---|---|---|
| 4,258,264 | 3/1981 | Kotera et al. | 250/484 |
| 5,060,233 | 10/1991 | Harder et al. | 372/22 |
| 5,077,751 | 12/1991 | Kudo et al. | 372/75 |
| 5,111,468 | 5/1992 | Kozlovsky et al. | 372/32 |
| 5,497,388 | 3/1996 | Goto et al. | 372/22 |
| 5,644,584 | 7/1997 | Nam et al. | 372/20 |
| 5,822,345 | 10/1998 | Sousa et al. | 372/38 |
| 5,926,495 | 7/1999 | Guch, Jr. | 372/75 |
| 5,930,030 | 7/1999 | Scifres | 359/341 |

FOREIGN PATENT DOCUMENTS

| | | | |
|---|---|---|---|
| 56-11395 | 2/1981 | Japan | G21K 4/00 |
| 56-11397 | 2/1981 | Japan | G21K 4/00 |
| 62-189783 | 8/1987 | Japan | H01S 3/109 |
| 6-291440 | 10/1994 | Japan | H05K 1/18 |

OTHER PUBLICATIONS

"1–1 W CW, Diffraction–Limited Operation of a Monolithically Integrated Flared–Amplifier Master Oscillator Power Amplifier"; Welch et al., Electronics Letters, Oct. 8, 1992 vol. 28 No. 21 pp. 2011–2013.

"Photonic Integrated Circuits for High–Power Coherent Diode Lasers", Welch; Optics & Photonics News/Mar. 1993, pp. 11–13.

*Primary Examiner*—Brian Healy
*Attorney, Agent, or Firm*—Sughrue, Mion, Zinn, Macpeak & Seas, PLLC

[57] ABSTRACT

In a laser-diode-pumped solid state laser, a solid laser crystal is pumped by a pumping laser beam emitted from a laser diode and a harmonic of light emitted from the pumped solid laser crystal is caused to make laser oscillation by a resonator structure containing therein a nonlinear optical crystal. The electric current to be poured into the laser diode is controlled so that the pumping laser beam emitted from the laser diode is kept at an output level at which the pumping laser beam cannot cause the harmonic of light emitted from the solid laser crystal to make laser oscillation though pumping the solid laser crystal.

5 Claims, 4 Drawing Sheets

LASER-DIODE-PUMPED SOLID STATE LASER AND RADIATION IMAGE READ-OUT SYSTEM

BACKGROUND OF THE INVENTION

1. Field of the Invention

This invention relates to a laser-diode-pumped solid state laser in which a solid laser crystal is pumped by a laser diode (semiconductor laser), a semiconductor laser and a radiation image read-out system, and more particularly to a laser which causes harmonics from a solid laser crystal to oscillate in laser oscillation and a radiation image read-out system.

2. Description of the Related Art

When certain kinds of phosphors are exposed to radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor". It has been proposed to use stimulable phosphors in radiation image recording and reproducing systems. Specifically, a radiation image of an object, such as a human body, is recorded on a stimulable phosphor sheet (a recording medium provided with a layer of the stimulable phosphor). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is used for reproducing the radiation image of the object as a visible image on a recording medium such a photosensitive material or a display such as a CRT. See U.S. Pat. No. 4,258,264 and Japanese Unexamined Patent Publication Nos. 56(1981)-11395 and 56(1981)-11397 and the like.

The radiation image recording and reproducing system is practically advantageous in that as compared with conventional radiographies, an image can be recorded over an extremely wide radiation exposure range.

When reading out radiation image information from the stimulable phosphor sheet in the radiation image recording and reproducing system, for instance, a light beam such as a laser beam is caused to two-dimensionally scan the stimulable phosphor sheet storing thereon a radiation image, and the light emitted from the stimulable phosphor sheet upon stimulation thereof is transmitted to a photodetector such as photomultiplier through an optical guide having a light inlet end face extending along the main scanning line. The photodetector detects in time series the light emitted from the stimulable phosphor sheet upon stimulation thereof and an image signal made up of image signal components for respective picture elements is obtained.

A red laser diode whose output power is about 30 mW at most has been employed as a stimulating ray source in the radiation image recording and reproducing system described above. In order to read out image information stored on a stimulable phosphor sheet and to obtain a reproduced image of high quality, the stored energy of radiation must be converted into light at a high efficiency and for this purpose, a higher output power stimulating light is required.

As disclosed, for instance, in Japanese Unexamined Patent Publication No. 62(1987)-189783, there has been known a laser-diode-pumped solid state laser in which a solid state laser crystal doped with a rare earth element such as neodymium is pumped by a light beam produced by a laser diode. Further in such a laser, a laser beam shorter than the fundamental wave in wavelength or a higher output laser beam can be obtained by disposing a nonlinear optical crystal in the resonator to selectively cause harmonics such as a second harmonic (SHG) of the solid laser beam to make laser oscillation. The harmonics can be as high as not lower than 300 mW in output power.

However it has been found that stability of such a second harmonic or the like is apt to be affected by the resonator and especially the laser output is instable until the resonator is thermally stabilized.

That is, as shown in FIG. 3A, when a current not less than the threshold above which laser oscillation is generated (e.g., 3 to 4 A) is directly poured into a pumping laser diode in an off state (in a state where no current is poured), the laser power of the second harmonic (SHG) is increased sharp but the laser power is once stabilized at a power about half of full power (300 mW in the example shown in FIG. 3A) before reaching the full power and then increased sharp to the full power. The time t1 required for the laser output to be stabilized at its full power after the pumping laser is turned on (will be referred to as "rise-up time", hereinbelow) is, for instance, 3 to 4 seconds in the SHG lasers though depending upon the laser medium and the current poured into the pumping laser diode.

An approach for suppressing time loss due to the rise-up time in the case where rapid processing is required as in the radiation image recording and reproducing system described above is to keep the SHG laser continuously operating. With this approach, since the SHG laser is constantly kept on, the time loss due to the rise-up time can be nullified. However, on the other hand, such continuous operation of the SHG laser results in an extreme reduction in the life of the laser and is undesirable from the viewpoint of economy.

SUMMARY OF THE INVENTION

In view of the foregoing observations and description, the primary object of the present invention is to provide a laser-diode-pumped solid state laser in which the rise-up time of a harmonic laser such as a SHG laser can be shortened without substantially shortening the life of the harmonic laser.

Another object of the present invention is to provide a semiconductor laser which can accomplish effect similar to that in the above laser-diode-pumped solid state laser.

Still another object of the present invention is to provide a radiation image read-out system in which a laser is employed in reading out image information stored on a stimulable phosphor sheet and the laser is a semiconductor laser which emits a harmonic laser beam higher in output power than the laser conventionally used in such a radiation image recording and reproducing system and in which the rise-up time can be shortened without substantially shortening the life of the laser.

In accordance with a first aspect of the present invention, there is provided a laser-diode-pumped solid state laser in which a solid laser crystal is pumped by a pumping laser beam emitted from a laser diode and a harmonic (e.g., a second harmonic) of light emitted from the pumped solid laser crystal is caused to make laser oscillation by a resonator structure containing therein a nonlinear optical crystal, wherein the improvement comprises a current control means which controls the electric current to be poured into the laser diode so that the pumping laser beam emitted from the laser diode is kept at an output level (a standby state) at which the pumping laser beam cannot cause the harmonic of light emitted from the solid laser crystal to make laser oscillation though pumping the solid laser crystal.

The expression "to make laser oscillation" as used here means "to radiate a laser beam outside", and when no laser beam is radiated outside of the resonator, it is not considered that laser oscillation is occurring.

In accordance with a second aspect of the present invention, there is provided a laser-diode-pumped solid state laser in which a solid laser crystal is pumped by a pumping laser beam emitted from a laser diode and a harmonic of light emitted from the pumped solid laser crystal is caused to make laser oscillation by a resonator structure containing therein a nonlinear optical crystal, wherein the improvement comprises a current control means which controls the electric current to be poured into the laser diode so that though it pumps the laser diode, it cannot cause the pumping laser beam to make laser oscillation.

For example, the current control means controls the current to be poured into the laser diode to be less than the threshold value in light emission properties of the laser diode.

In accordance with a third aspect of the present invention, there is provided a radiation image read-out system in which a stimulating light beam is caused to scan a stimulable phosphor sheet on which radiation image information of an object is stored, thereby causing each scanning spot on the stimulable phosphor sheet to emit light in proportion to the amount of energy of radiation stored thereon, and the light emitted from each scanning spot is photoelectrically read out, thereby obtaining the radiation image information of the object, and which is characterized in that said stimulating light beam is a harmonic such as a second harmonic radiated in laser oscillation from a laser-diode-pumped solid state laser in accordance with said first or second aspect of the present invention.

The laser-diode-pumped solid state laser in accordance with the first and second aspects of the present invention can also be applied to other system including an image read out section, e.g., a built-in type radiation image recording and reproducing system in which an image taking section, an image read-out section and an erasing section are provided along a circulation path, a plurality of stimulable phosphor sheets are conveyed along the circulation path, and the stimulable phosphor sheets are repeatedly used in the system.

In accordance with a fourth aspect of the present invention, there is provided a master oscillator power amplifier laser (a semiconductor laser) characterized by having a current control means which controls the electric current to be poured into the master oscillator power amplifier laser so that though pumped by the electric current, the master oscillator power amplifier laser cannot make laser oscillation.

The master oscillator power amplifier laser is a type of semiconductor laser and is generally referred to as "a MOPA laser". The master oscillator power amplifier laser is introduced in "Electronics Letters", Vol. 28, No.2, pp 2011 to 2013, "Optics & Photonics News", Mch. '93, pp 11 to 13, and the like. As a chip of the master oscillator power amplifier laser is shown in FIG. 6, the master oscillator power amplifier laser comprises an active region 10a, a single mode optical waveguide 10b, a master oscillator portion 10c and a power amplifier portion 10d.

In Japanese Unexamined Patent Publication No. 6(1994)-291440, there is disclosed a master oscillator power amplifier laser in which a fundamental wave emitted from the master oscillator portion 10c is amplified by the power amplifier portion 10d comprising a traveling wave amplifier and is radiated from the front end face 10e, and which is, for instance, 200 $\mu$m in emission width, 860 nm in oscillation wavelength $\lambda$1, and 3 W in output power.

In accordance with a fifth aspect of the present invention, there is provided a radiation image read-out system in which a stimulating light beam is caused to scan a stimulable phosphor sheet on which radiation image information of an object is stored, thereby causing each scanning spot on the stimulable phosphor sheet to emit light in proportion to the amount of energy of radiation stored thereon, and the light emitted from each scanning spot is photoelectrically read out, thereby obtaining the radiation image information of the object, and which is characterized in that said stimulating light beam is a laser beam radiated in laser oscillation from a master oscillator power amplifier laser in accordance with said fourth aspect of the present invention.

In the laser-diode-pumped solid state laser in accordance with the first aspect of the present invention, since the electric current to be poured into the laser diode is controlled so that the pumping laser beam emitted from the laser diode is kept at an output level at which the pumping laser beam cannot cause the harmonic of light emitted from the solid laser crystal to make laser oscillation though pumping the solid laser crystal, the resonator structure is heated by heat generated by pumping energy. As a result, the time required for the resonator structure to be thermally stabilized is shortened to about one third as compared with when the solid laser crystal is not pumped at all.

On the other hand, the electric current to be poured into the laser diode in the standby state is only about one third (about 1 A) of that required to cause the solid laser crystal to make laser oscillation (3 to 4 A). Accordingly, the life of the laser diode can be as long as about five times that when the laser diode continuously causes the solid laser crystal to make laser oscillation.

Thus in accordance with the first aspect of the present invention, the rise-up time of the harmonic laser can be shortened while suppressing reduction in the life of the laser.

In the laser-diode-pumped solid state laser in accordance with the second aspect of the present invention, since the electric current to be poured into the laser diode in the standby state is controlled so that though it pumps the laser diode, it cannot cause the pumping laser beam to make laser oscillation. In such a standby state, though the laser diode does not emit a laser beam, the time required for the laser diode to start emission of a laser beam (rise-up time) is shortened as compared with when the laser diode is not pumped at all. As a result, the time required for the output of the harmonic laser of the solid state laser pumped by the laser diode to be stabilized can be shortened as compared with when the laser diode is not pumped at all.

At the same time, since the electric current to be poured into the laser diode only to pump the laser diode may be at an extremely low level as compared with the threshold current, the life of the laser diode can be elongated as compared with when the laser diode continuously causes the solid state laser to make laser oscillation.

Thus in accordance with the second aspect of the present invention, the rise-up time of the harmonic laser can be shortened while suppressing reduction in the life of the laser.

In the radiation image read-out system in accordance with the third aspect of the present invention, since the stimulating light beam is a laser beam radiated from the laser-diode-pumped solid state laser in accordance with said first or second aspect of the present invention, a harmonic laser beam which is higher in output power than those conventionally employed can be employed and accordingly a larger amount of stimulating energy can be given to the stimulable phosphor sheet, whereby energy of radiation stored in the stimulable phosphor sheet can be more converted to light and the light can be read-out at a higher speed.

Further in the radiation image read-out system, the rise-up time of the laser for use in reading out the radiation image can be shortened while suppressing reduction in the life of the laser.

In the radiation image read-out system, it is preferred that the output of the stimulating beam be stabilized in a second or so after switching from the standby state to the ON-state. When the laser-diode-pumped solid state laser in accordance with the first and second aspect of the present invention is employed in a so-called built-in type radiation image recording and reproducing system in which an image taking section, an image read-out section and an erasing section are provided along a circulation path, a plurality of stimulable phosphor sheets are conveyed along the circulation path, and the stimulable phosphor sheets are repeatedly used in the system, it normally takes about 2 seconds for the stimulable phosphor sheet to be conveyed from the image taking section to the image read-out section, the output of the stimulating beam has only to be stabilized in two seconds or so after switching from the standby state to the ON-state.

In the master oscillator power amplifier laser in accordance with the fourth aspect of the present invention, since the electric current to be poured into the master oscillator power amplifier laser in the standby state is controlled so that though pumped by the electric current, the master oscillator power amplifier laser cannot make laser oscillation, the master oscillator power amplifier laser is heated by heat generated by pumping energy. As a result, the time required for the resonator structure to be thermally stabilized is shortened as compared with a semiconductor laser which is not pumped at all.

At the same time, since the electric current to be poured into the master oscillator power amplifier laser in the standby state may be at a low level as compared with that required to cause the master oscillator power amplifier laser to make laser oscillation, the life of the master oscillator power amplifier laser can be elongated as compared with when the solid state laser is caused to continuously make laser oscillation.

Thus in accordance with the fourth aspect of the present invention, the rise-up time of the master oscillator power amplifier laser can be shortened while suppressing reduction in the life of the laser.

In the radiation image read-out system in accordance with the fifth aspect of the present invention, since the stimulating light beam is a laser beam raditated from the master oscillator power amplifier laser in accordance with the fourth aspect of the present invention, a laser beam which is higher in output power than those conventionally employed can be employed and accordingly a larger amount of stimulating energy can be given to the stimulable phosphor sheet, whereby energy of radiation stored in the stimulable phosphor sheet can be more converted to light and the light can be read-out at a higher speed.

Further in the radiation image read-out system, the rise-up time of the laser for use in reading out the radiation image can be shortened while suppressing reduction in the life of the laser.

In the radiation image read-out system, it is preferred that the output of the stimulating beam be stabilized in a second or so after switching from the standby state to the ON-state. When the master oscillator power amplifier laser in accordance with the fourth aspect of the present invention is employed in a so-called built-in type radiation image recording and reproducing system in which an image taking section, an image read-out section and an erasing section are provided along a circulation path, a plurality of stimulable phosphor sheets are conveyed along the circulation path, and the stimulable phosphor sheets are repeatedly used in the system, it normally takes about 2 seconds for the stimulable phosphor sheet to be conveyed from the image taking section to the image read-out section, the output of the stimulating beam has only to be stabilized in two seconds or so after switching from the standby state to the ON-state.

DESCRIPTION OF THE PREFERRED EMBODIMENTS

Figure 1:
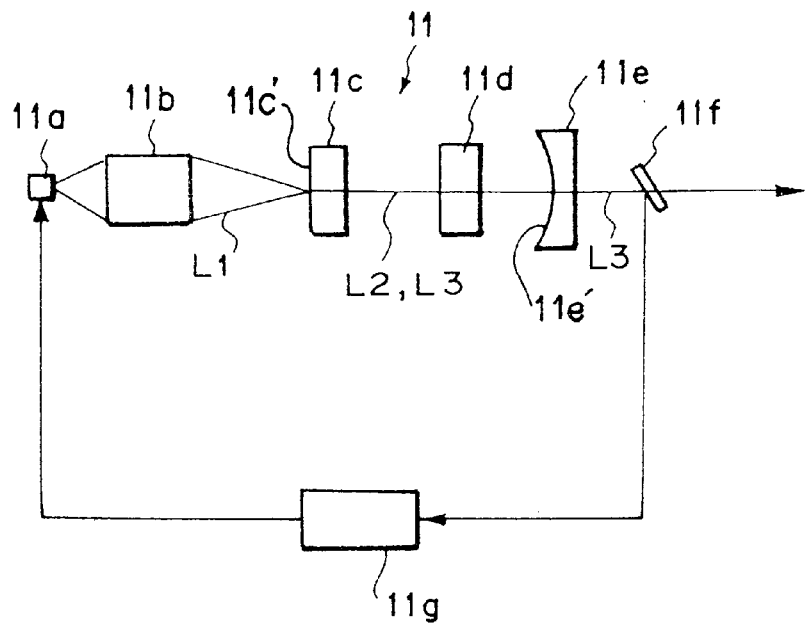
FIG. 1 is a schematic view showing a laser-diode-pumped solid state laser in accordance with a first embodiment of the present invention.

In FIG. 1, a laser-diode-pumped solid state laser 11 in accordance with a first embodiment of the present invention comprises a semiconductor laser 11a (in the form of a chip) which produces a laser beam L1 as a pumping beam, a condenser lens 11b which may comprise, for instance, a rod lens of distributed refractive index type and condenses the laser beam L1 produced as divergent light, a YLF crystal 11c which is a solid laser medium doped with neodymium (Nd) (will be referred to as "Nd:YLF crystal 11c", hereinbelow), a resonator mirror 11e disposed forward (the right side as seen in FIG. 1) of the Nd:YLF crystal 11c, a KNbO$_3$ crystal 11d disposed between the resonator mirror 11e and the Nd:YLF crystal 11c and a current control means 11g which controls the electric current to be poured into the semiconductor laser 11a so that the pumping laser beam L1 is kept at an output level at which the pumping laser beam L1 cannot cause the Nd:YLF crystal 11c to make laser oscillation though pumping the Nd:YLF crystal 11c.

The semiconductor laser 11a produces a laser beam L1 having a wavelength of 797 nm. Neodymiumn ions in the Nd:YLF crystal 11c are stimulated by the laser beam L1 and the Nd:YLF crystal 11c thereby produces a laser beam having a wavelength of 1313 nm. The pumping light incident side end face 11c' of the Nd:YLF crystal 11c is provided with a coating which is highly reflecting (a reflectivity of not lower than 99.9%) to 1313 nm and antireflecting (a transmittance of not lower than 99%) to 797 nm (the wavelength of pumping leaser beam L1). The mirror surface 11e' of the resonator mirror 11e is provided with a coating which is highly reflecting to 1313 nm and antireflecting at 657 nm (the wavelength of second harmonic to be described later).

Thus the light beam of a wavelength of 1313 nm is confined between the surfaces 11c' and 11e' and makes laser oscillation. The laser beam L2 thus produced is converted by the $KNbO_3$ crystal 11d into its second harmonic L3 having a wavelength of 657 nm equal to a half of the wavelength of the laser beam L2. The second harmonic L3 is mainly output from the resonator mirror 11e.

The semiconductor laser 11a and the condenser lens 11b are fixed to a holder (not shown), and the Nd:YLF crystal 11c, the $KNbO_3$ crystal 11d and the resonator mirror 11e are fixed to another holder (not shown). The holders are fixed to a base plate which is formed of, for instance, copper.

A half transmission mirror 11f is disposed behind the resonator mirror 11e. The half transmission mirror 11f transmits a major part of the second harmonic L3 as an operating laser beam and reflects a part of the second harmonic L3 as a detecting light. The reflected part of the second harmonic L3 is input into the current control means 11g. The current control means 11g controls the electric current to be poured into the semiconductor laser 11a so that the pumping laser beam L1 is kept at an output level at which the pumping laser beam L1 cannot cause the Nd:YLF crystal 11c to make laser oscillation though pumping the Nd:YLF crystal 11c (e.g., at 1 A), and at the same time controls the electric current to 0 not to pump the semiconductor laser 11a and to a value (e.g., 3 to 4 A) sufficient for the semiconductor laser 11a to produce the pumping laser beam L1 at a power sufficient to cause the Nd:YLF crystal 11c to make laser oscillation.

The operation of the laser-diode-pumped solid state laser 11 of this embodiment will be described hereinbelow.

Figure 2:
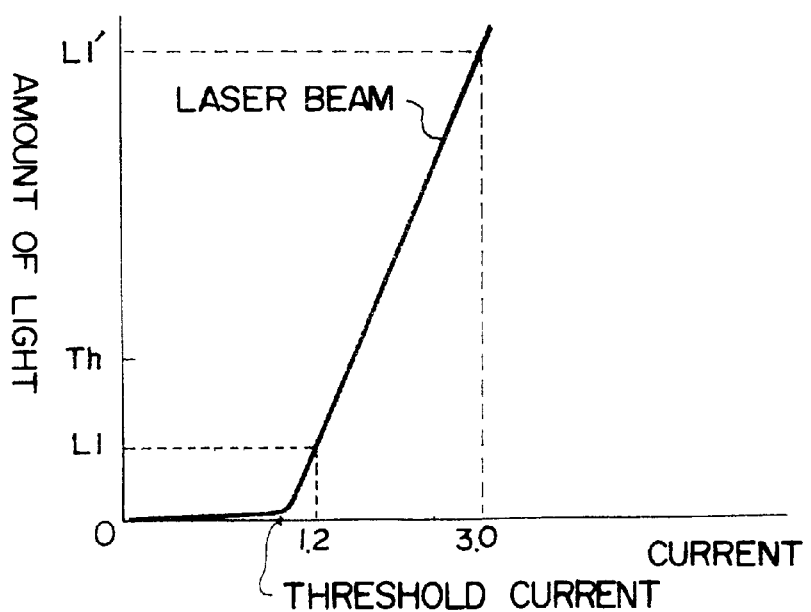
FIG. 2 is a graph showing the light emission properties of the pumping laser.

The current control means 11g pours a predetermined electric current into the semiconductor laser 11a. The light emission properties of the semiconductor laser 11a are as shown in FIG. 2, and the electric current poured into the semiconductor laser 11a at this time is, for instance, about 1.2 A. As can be seen from FIG. 2, such an electric current slightly exceeds a threshold current over which the semiconductor laser 11a emits the pumping laser beam L1. Accordingly, a pumping laser beam L1 of intensity (the amount of light) according to the amount of electric current poured into the semiconductor laser 11a is emitted from the semiconductor laser 11a.

The pumping laser beam L1 is condensed by the condenser lens 11b and impinges upon the Nd:YLF crystal 11c to pump the Nd:YLF crystal 11c.

The Nd:YLF crystal 11c pumped by the laser beam L1 emits light L2 of 1313 nm (fundamental wave). The fundamental wave L2 impinges upon the $KNbO_3$ crystal 11d and is converted into its second harmonic L3 of 657 nm.

As the intensity of the pumping laser beam L1 (depending on the amount of electric current to be poured into the semiconductor laser 11a) increases, the pumping energy for the Nd:YLF crystal 11c increases, whereby the number of active ions in a metastable state is more apt to be increased and laser oscillation is more apt to occur.

However since the electric current poured into the semiconductor laser 11a is only slightly larger than the threshold value in this case, the emitted pumping laser beam L1 is weak in its intensity and accordingly though the Nd:YLF crystal 11c is pumped to emit the fundamental wave L2, the pumping energy is attenuated while the fundamental wave L2 travels back and forth in the resonator structure formed by the end face 11c' of the Nd:YLF crystal 11c and the mirror surface 11e' of the resonator mirror 11e and the fundamental wave L2 (actually the second harmonic L3 generated by the $KNbO_3$ crystal 11d) is never radiated from the resonator mirror 11e because of the pumping energy smaller than the threshold value Th. Such a state where the Nd:YLF crystal 11c is pumped but laser oscillation cannot be occurred will be referred to as the standby state.

In this standby state, though the Nd:YLF crystal 11c is not pumped to such an extent that the Nd:YLF crystal 11c makes laser oscillation but the resonator structure generates heat to some extent by the pumping action it undergoes. Accordingly, the resonator structure is kept preheated and when the Nd:YLF crystal 11c subsequently starts laser oscillation, thermal stability can be easily attained.

Though the current control means 11g has been described to pour a predetermined electric current into the semiconductor laser 11a, actually the current control means 11g keeps detecting that no second harmonic L3 is radiated from the resonator mirror 11e and performs feedback control on the basis of the result of the detection. That is, when detecting that the second harmonic L3 is radiated through the resonator mirror 11e, the current control means 11g reduces the electric current poured into the semiconductor laser 11a.

The operation when the second harmonic L3 is to be caused to make laser oscillation from the standby state will be described hereinbelow.

When the second harmonic L3 is to be radiated outside the resonator structure in order to use the second harmonic L3, for instance, a switching signal (not shown) is input into the current control means 11g and the current control means 11g controls the amount of electric current to be poured into the semiconductor laser 11a so that a desired laser power of the second harmonic L3 can be obtained. The correspondence between the amount of electric current poured into the semiconductor laser 11a and the laser power of the second harmonic L3 to be output may be mapped on the basis of the light emission properties of the semiconductor laser 11a (FIG. 2), the light emission properties of the Nd:YLF crystal 11c and optical properties of the $KNbO_3$ crystal 11d, the resonator structure and the half transmission mirror 11f.

The semiconductor laser 11a radiates a laser beam L1' in an intensity corresponding to the amount of electric current (e.g., 3 A) poured into the semiconductor laser 11a and the laser beam L1' pumps the Nd:YLF crystal 11c. The pumping energy of the laser beam L1' at this time is sufficiently larger than that in the standby state and exceeds the threshold value Th. Accordingly, the Nd:YLF crystal 11c emits a fundamental wave L2 and the fundamental wave L2 is converted into its second harmonic L3. The second harmonic L3 is amplified while it travels back and forth in the resonator structure formed by the end face 11c' of the Nd:YLF crystal 11c and the mirror surface 11e' of the resonator mirror 11e and then is radiated through the resonator mirror 11e. The state where the second harmonic L3 is being radiated will be referred to as "ON-state".

In the conventional laser-diode-pumped solid state lasers, no electric current is poured into the semiconductor laser 11a in any state other than the "ON-state". To the contrast, since the laser-diode-pumped solid state laser 11 of this embodiment takes the standby state when not in the ON-state, the resonator structure of the Nd:YLF crystal 11c can be preheated, and accordingly, the time required for the resonator structure to be thermally stabilized can be reduced to about one third as compared with the conventional laser-diode-pumped solid state laser. This is shown in FIGS. 3A and 3B.

Figure 3A:
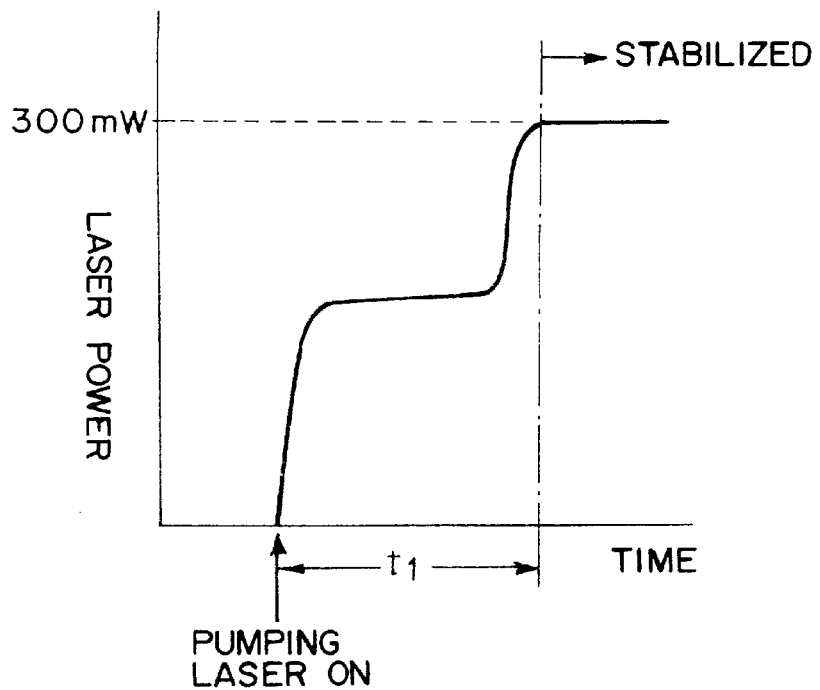
FIG. 3A and 3B are graphs showing stability of the laser power in time series.
Figure 3B:
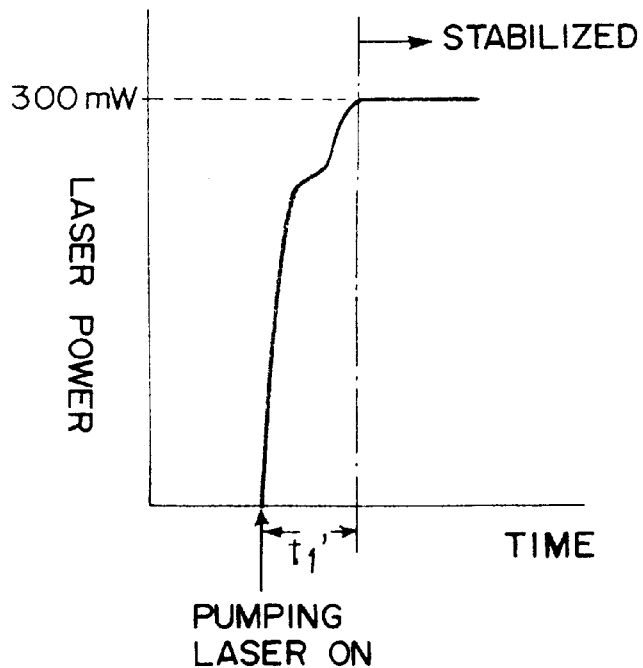

FIG. 3A shows the relation between the time and the laser power of the second harmonic when an electric current (3 to 4 A) sufficient for the pumping semiconductor laser 11a to cause the second harmonic to make laser oscillation is directly poured into the semiconductor laser 11a in the off-state (where no electric current is poured into the laser) in the conventional laser-diode-pumped solid state laser, and FIG. 3B shows the relation between the time and the laser power of the second harmonic when an electric current (3 to 4 A) sufficient for the pumping semiconductor laser 11a to cause the second harmonic to make laser oscillation is directly poured into the semiconductor laser 11a in the standby state in the laser-diode-pumped solid state laser 11 of this embodiment.

In the conventional laser-diode-pumped solid state laser shown in FIG. 3A, the laser power of the second harmonic rapidly increases upon switching to the ON-state but is once stabilized at a power about hall of full power (300 mW in the example shown in FIG. 3A) before reaching the full power and then increased sharp to the full power. The rise-up time t1 required for the laser Output to be stabilized at its full power after the pumping laser is turned on is, for instance, 3 to 4 seconds in the example shown in FIG. 3A though depending upon the laser medium and the current poured into the pumping laser diode.

To the contrast, in the laser-diode-pumped solid state laser of this embodiment shown in FIG. 3B, the laser power of the second harmonic rapidly increases upon switching to the ON-state up to the full power (300 mW in the example shown in FIG. 3B) though increase in power once slows down slightly before reaching the full power. The rise-up time t1 required for the laser output to be stabilized at its full power is only about one second which is only one third of that in the conventional laser-diode-pumped solid state laser.

Further since the electric current to be poured into the semiconductor laser in the standby state may be smaller than the threshold value Th required to cause the Nd:YLF crystal to make laser oscillation, the life of the semiconductor laser can be elongated as compared with when the semiconductor laser continuously causes the second harmonic to make laser oscillation.

Thus in the laser-diode-pumped solid state laser of this embodiment, the rise-up time of the harmonic laser can be shortened while suppressing reduction in the life of the laser.

Figure 4:
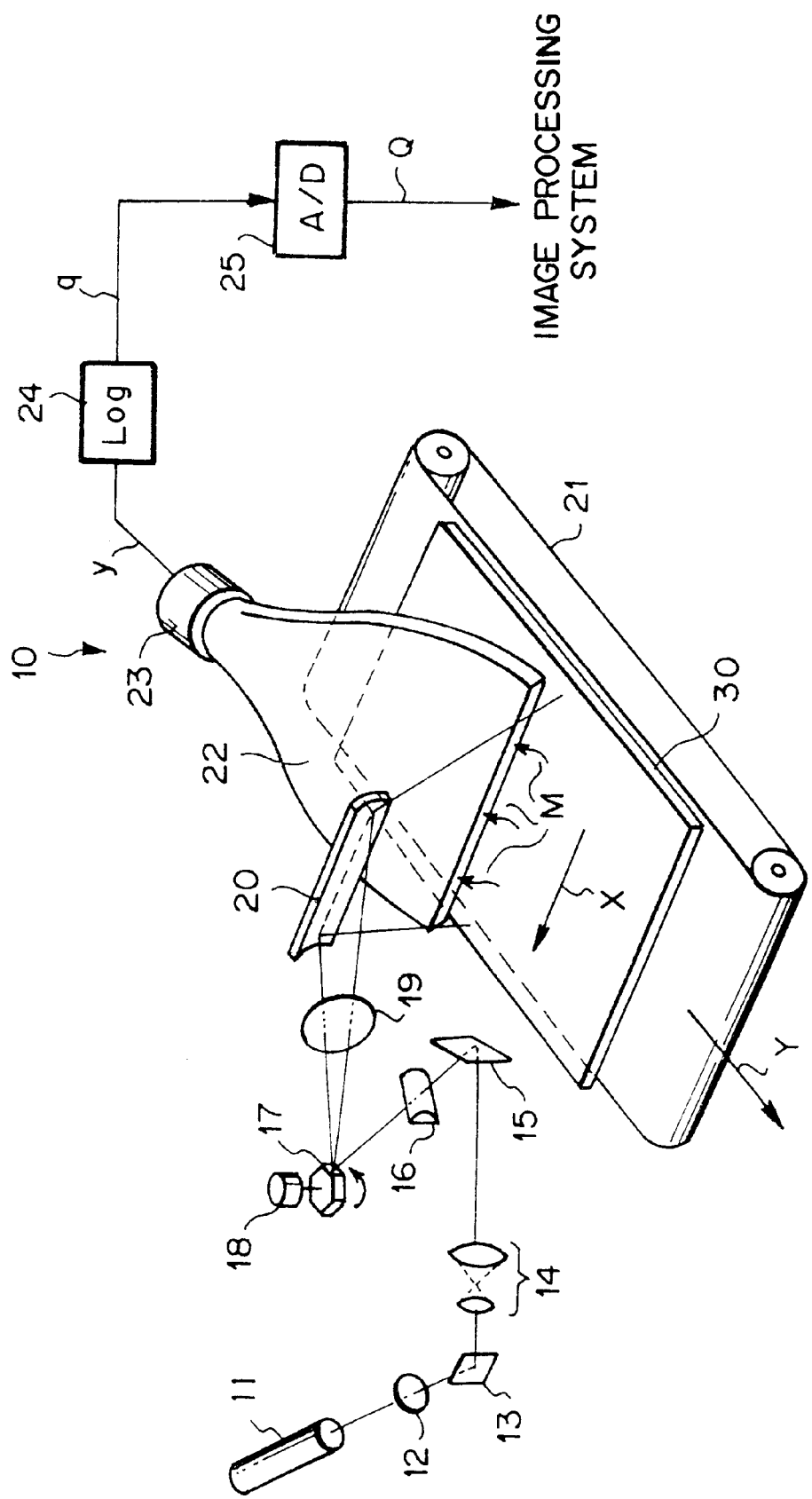
FIG. 4 is a view showing a main part of a radiation image read-out system in accordance with another embodiment of the present invention.

FIG. 4 shows a radiation image read-out system in accordance with a second embodiment of the present invention.

In the radiation image read-out system 10 shown in FIG. 4, a stimulating light beam L3 is caused to scan a stimulable phosphor sheet 30, on which radiation image information has been stored, thereby causing each scanning spot on the stimulable phosphor sheet 30 to emit light M in proportion to the amount of energy of radiation stored thereon, and the light M emitted from each scanning spot is photoelectrically read out, thereby obtaining radiation image information y. As the stimulating light beam L3, a second harmonic radiated in laser oscillation from a laser-diode-pumped solid state laser in accordance with said first embodiment of the present invention is employed.

Specifically the stimulable phosphor sheet 30 is placed on an endless belt 21 which is driven by a motor (not shown). There are disposed above the stimulable phosphor sheet 30 a laser-diode-pumped solid state laser 11 (in accordance with the first embodiment of the present invention) which emits a second harmonic laser beam L3 (as the stimulating light beam) at 300 mW, a half-wave plate 12 which gives a phase difference of n to the second harmonic laser beam L3 impinging thereupon so that the second harmonic laser L3 impinges upon a rotating polygonal mirror to be described later as a s-polarized light, a mirror 13 which reflects the second harmonic laser beam L3 emanating from the half-wave plate 12, a beam expander 14 which enlarges the beam diameter, a mirror 15, a cylindrical lens 16 which has a refractive power only in a direction corresponding to the sub-scanning direction (the direction in which the stimulable phosphor sheet 30 is conveyed) so as to compensate for surface tilt in rotating polygonal mirror 17 in a direction corresponding to the sub-scanning direction, the rotating polygonal mirror 17 whose reflecting surfaces are processed by aluminum and multi-layered coating, a motor 18 for driving the rotating polygonal mirror 18, and a combination of an fθ lens 19 and a cylindrical mirror 20 which focus the second harmonic laser beam L3 deflected at the polygonal mirror 17 on the stimulable phosphor sheet 30 and cause to scan the stimulable phosphor sheet 30 at a constant speed.

A light guide 22 is disposed close to the stimulable phosphor sheet 30 immediately thereabove to collect the light M emitted from the stimulable phosphor sheet 30 upon stimulation by the second harmonic laser beam L3. A photomultiplier 23 which photoelectrically detects the light M and converts it into an analog image signal y is connected to the light guide 22.

A logarithmic amplifier 24 is connected to the photomultiplier 23 and outputs a logarithmic image signal q by logarithmic transformation of the analog image signal y. An A/D convertor 25 is connected to the logarithmic amplifier 24 and converts the logarithmic image signal q to a digital image signal Q.

The operation of the radiation image read-out system of this embodiment will be described, hereinbelow.

In the standby state, the resonator structure in the laser-diode-pumped solid state laser 11 is preheated but neither the second harmonic laser beam L3 nor any other light is radiated from the laser 11.

Then the laser 11 is turned on, and the stimulable phosphor sheet 30 on the endless belt 21 is conveyed in the direction of arrow Y (sub-scanning). When the laser 11 is turned on, the second harmonic laser beam L3 is radiated from the laser 11. At this time, the rise-up time required for the laser beam L3 to be stabilized at its full power is only one third of that in the conventional laser-diode-pumped solid state laser and accordingly in the radiation image read-out system 10, read-out of image information can be started in a shorter time.

The second harmonic laser beam L3 radiated from the laser 11 impinges upon the half-wave plate 12 and is given a phase difference of π. Then the laser beam L3 is reflected by the mirror 13 after passing through the half-wave plate 12, and is expanded in its beam diameter by the beam expander 14, and is reflected by the mirror 15 to impinge upon the cylindrical lens 16.

The cylindrical lens 16 refracts the laser beam L3 in a direction corresponding to the sub-scanning direction and causes the laser beam L3 to impinge upon the rotating polygonal mirror 17 in the form of s-polarized light. When the laser beam L3 impinges upon the polygonal mirror 17 in the form of s-polarized light, the reflectivity can be increased as compared with when the laser beam L3 impinges upon the polygonal mirror 17 in the form of p-polarized light, and the stimulating energy of the laser beam L3 can be imparted to the stimulable phosphor sheet 30 at a high efficiency.

The laser beam L3 is reflected by the polygonal mirror 17 toward the fθ lens 19 and is cauesed to scan the stimulable phosphor sheet 30 in the direction of arrow X (the main scanning direction) substantially perpendicular to the sub-scanning direction Y by the combination of the fθ lens 19 and the cylindrical mirror 20. By the main scanning and the sub-scanning the entire area of the stimulable phosphor sheet 30 is exposed to the second harmonic laser beam L3. Since the second harmonic laser beam L3 is as high as 300 mW in output power, larger stimulating energy can be given to the stimulable phosphor sheet 30, and the energy of radiation stored on the stimulable phosphor sheet 30 can be more converted to light.

The second harmonic laser beam L3 impinging upon the stimulable phosphor sheet 30 stimulates the stimulable phosphor on the sheet 30 to emit light M according to the radiation image information stored on the sheet 30.

The light M emitted from the stimulable phosphor sheet 30 upon stimulation thereof is guided to the photomultiplier 23 by the light guide 22 disposed close to the surface of the stimulable phosphor sheet 30 and is photoelectrically detected by the photomultiplier 23. The light guide 22 is formed of a light guide material such as an acrylic plate. The light guide 22 is provided with a linear light inlet end face disposed to extend along the main scanning line of the stimulable phosphor sheet 30 and a circular light outlet end face to which the light receiving face of the photomultiplier 23 is coupled. The light M which enters the light guide 22 through the light inlet face is guided to the light outlet face through repeated total reflection and impinges upon the light receiving face of the photomultiplier 23. The photomultiplier 23 converts the amount p of the light M into an analog image signal y.

The analog signal y output from the photomultiplier 23 is logarithmically amplified by the logarithmic amplifier 24 into a logarithmic image signal q.

The logarithmic image signal q is input into the A/D convertor 25 and the A/D convertor 25 converts the logarithmic image signal q into a digital image signal Q made up of digital image signal components for respective picture elements by sampling the logarithmic image signal q at predetermined sampling intervals in synchronization with scanning by the second harmonic laser beam L3 and quantizing the sampled data.

The digital image signal Q is output to an external image processing system and reproduced as a visible image for use, for instance, in diagnosis by a doctor or the like.

In the radiation image read-out system 10 in accordance with the present invention, since the second harmonic laser beam radiated from the laser-diode-pumped solid state laser in accordance with the first embodiment of the present invention is employed as the stimulating light beam, larger stimulating energy can be given to the stimulable phosphor sheet and the energy of radiation stored on the stimulable phosphor sheet can be more converted to light.

Further in the radiation image read-out system of this embodiment, the rise-up time of the leaser for use in reading out the radiation image can be shortened while suppressing reduction in the life of the laser.

Figure 5:
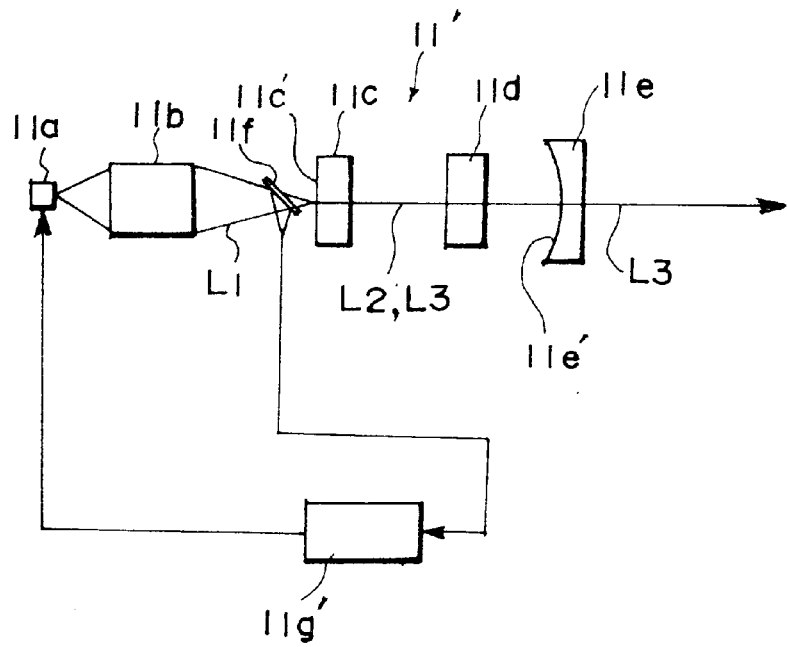
FIG. 5 is a schematic view showing a laser-diode-pumped solid state laser in accordance with a third embodiment of the present invention.
Figure 6:
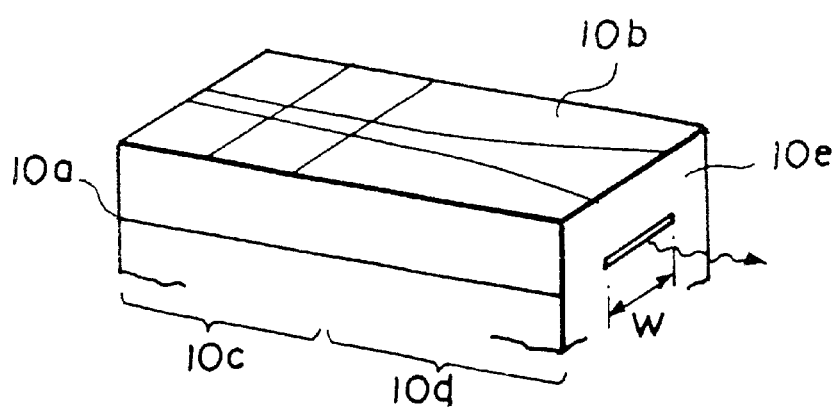
FIG. 6 is a view showing a master oscillator power amplifier laser.

A laser-diode-pumped solid state laser in accordance with a third embodiment of the present invention will be described with reference to FIG. 5, hereinbelow. The laser-diode-pumped solid state laser 11' of this embodiment is similar to that 11 shown in FIG. 1 except the following points, and accordingly the components analogous to those shown in FIG. 1 are given the same reference numerals and will not be described here. That is, whereas the half-transmission mirror 11f is disposed behind the resonator mirror 11e in the first embodiment, the half-transmission mirror 11f is disposed between the condenser lens 11b and the Nd:YLF crystal 11c in this embodiment shown in FIG. 5. Further whereas, in the first embodiment, the current control means 11g controls the electric current to be poured into the semiconductor laser 11a so that the laser beam L1 pumps the Nd:YLF crystal 11c to emit the fundamental wave L2 but the fundamental wave L2 (actually the second harmonic L3 generated by the KNbO$_3$ crystal 11d) is never radiated from the resonator mirror 11e, the current control means 11g' in this embodiment controls the electric current to be poured into the semiconductor laser 11a so that it does not cause the pumping laser beam L1 to make laser oscillation though pumping the semiconductor laser 11a.

The part of the light emanating from the condenser lens 11b reflected by the half-transmission mirror 11f is input into the current control means 11g' as a detecting light. The current control means 11g' controls the electric current to be poured into the semiconductor laser 11a so that the current pumps the semiconductor laser 11a but cannot cause the pumping laser beam L1 to make laser oscillation, and at the same time controls the electric current to 0 not to pump the semiconductor laser 11a and to a value (e.g., 3 to 4 A) sufficient for the semiconductor laser 11a to produce the pumping laser beam L1 at a power sufficient to cause the Nd:YLF crystal 11c to make laser oscillation.

The operation of the laser-diode-pumped solid state laser 11' will be described, hereinbelow.

The current control means 11g' pours a predetermined electric current into the semiconductor laser 11a. The light emission properties of the semiconductor laser 11a are as shown in FIG. 2, and the electric current poured into the semiconductor laser 11a at this time is not larger than the threshold value but is not 0. Accordingly, only spontaneous emission of light of intensity (the amount of light) according to the amount of electric current poured into the semiconductor laser 11a occurs but no laser oscillation occurs. However the semiconductor laser 11a is preheated by the electric current. Such a state where the semiconductor laser 11a is preheated but laser oscillation cannot be occurred will be referred to as the standby state.

In this standby state, though the semiconductor laser 11a does not cause a laser oscillation but the semiconductor laser 11a itself is heated to some extent by the electric current. Accordingly, when the semiconductor laser 11a subsequently starts laser oscillation, thermal stability can be easily attained.

Though the current control means 11g' has been described to pour a predetermined electric current into the semiconductor laser 11a, actually the current control means 11g' keeps detecting that no pumping laser beam L1 is radiated from the condenser lens 11b and performs feedback control on the basis of the result of the detection. That is, when detecting that the pumping laser beam L1 is radiated from the condenser lens 11b, the current control means 11g reduces the electric current poured into the semiconductor laser 11a.

The operation when the second harmonic L3 is to be caused to make laser oscillation from the standby state will be described hereinbelow.

When the second harmonic L3 is to be radiated outside the resonator structure in order to use the second harmonic L3, for instance, a switching signal (not shown) is input into the current control means 11g' and the current control means 11g' controls the amount of electric current to be poured into the semiconductor laser 11a so that a desired laser power of the second harmonic L3 can be obtained. The correspondence between the amount of electric current poured into the semiconductor laser 11a and the laser power of the second harmonic L3 to be output may be mapped on the basis of the light emission properties of the semiconductor laser 11a (FIG. 2), the light emission properties of the Nd:YLF crystal 11c and optical properties of the $KNbO_3$ crystal 11d, the resonator structure and the half transmission mirror 11f.

The semiconductor laser 11a radiates a laser beam L1' in an intensity corresponding to the amount of electric current (e.g., 3 A) poured into the semiconductor laser 11a and the laser beam L1' pumps the Nd:YLF crystal 11c. The pumping energy of the laser beam L1' at this time exceeds the threshold value Th. Accordingly, the Nd:YLF crystal 11c emits a fundamental wave L2 and the fundamental wave L2 is converted into its second harmonic L3. The second harmonic L3 is amplified while it travels back and forth in the resonator structure formed by the end face 11c' of the Nd:YLF crystal 11c and the mirror surface 11e' of the resonator mirror 11e and then is radiated through the resonator mirror 11e. The state where the second harmonic L3 is being radiated will be referred to as "ON-state".

In the conventional laser-diode-pumped solid state lasers, no electric current is poured into the semiconductor laser 11a in any state other than the "ON-state". To the contrary, since the laser-diode-pumped solid state laser 11' of this embodiment takes the standby state, where the semiconductor laser 11a is pumped, when not in the ON-state, the semiconductor laser 11a can be preheated, and accordingly, the time required for the semiconductor laser 11a to be thermally stabilized can be reduced and the time required for the laser power to be stabilized can be reduced as compared with the conventional laser-diode-pumped solid state laser.

Thus in the laser-diode-pumped solid state laser of this embodiment, the rise-up time of the harmonic laser can be shortened while suppressing reduction in the life of the laser.

What is claimed is:

1. A laser-diode-pumped solid state laser in which a solid laser crystal is pumped by a pumping laser beam emitted from a laser diode and a harmonic of light emitted from the pumped solid laser crystal is caused to make laser oscillation by a resonator structure containing therein a nonlinear optical crystal, wherein the improvement comprises a current control means which controls the electric current to be poured into the laser diode so that the pumping laser beam emitted from the laser diode is kept at an output level at which the pumping laser beam cannot cause the harmonic of light emitted from the solid laser crystal to make laser oscillation though pumping the solid laser crystal.

2. A laser-diode-pumped solid state laser in which a solid laser crystal is pumped by a pumping laser beam emitted from a laser diode and a harmonic of light emitted from the pumped solid laser crystal is caused to make laser oscillation by a resonator structure containing therein a nonlinear optical crystal, wherein the improvement comprises a current control means which controls the electric current to be poured into the laser diode so that though it pumps the laser diode, it cannot cause the pumping laser beam to make laser oscillation.

3. A radiation image read-out system in which a stimulating light beam is caused to scan a stimulable phosphor sheet on which radiation image information of an object is stored, thereby causing each scanning spot on the stimulable phosphor sheet to emit light in proportion to the amount of energy of radiation stored thereon, and the light emitted from each scanning spot is photoelectrically read out, thereby obtaining the radiation image information of the object, wherein the improvement comprises that said stimulating light beam is a harmonic radiated in laser oscillation from a laser-diode-pumped solid state laser defined in claim 1 or 2.

4. A master oscillator power amplifier laser characterized by having a current control means which controls the electric current to be poured into the master oscillator power amplifier laser so that though pumped by the electric current, the master oscillator power amplifier laser cannot make laser oscillation.

5. A radiation image read-out system in which a stimulating light beam is caused to scan a stimulable phosphor sheet on which radiation image information of an object is stored, thereby causing each scanning spot on the stimulable phosphor sheet to emit light in proportion to the amount of energy of radiation stored thereon, and the light emitted from each scanning spot is photoelectrically read out, thereby obtaining the radiation image information of the object, wherein the improvement comprises that said stimulating light beam is a laser beam radiated in laser oscillation from a master oscillator power amplifier laser defined in claim 4.

\* \* \* \* \*